(12) United States Patent
Mishima et al.

(10) Patent No.: US 10,828,909 B2
(45) Date of Patent: Nov. 10, 2020

(54) THERMAL TRANSFER PRINTER AND METHOD FOR PRODUCING PRINTED MATTER

(71) Applicant: Mitsubishi Electric Corporation, Tokyo (JP)

(72) Inventors: Megumi Mishima, Tokyo (JP); Shiohiro Okinaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/340,662

(22) PCT Filed: Aug. 8, 2018

(86) PCT No.: PCT/JP2018/029740
§ 371 (c)(1),
(2) Date: Apr. 9, 2019

(87) PCT Pub. No.: WO2020/031287
PCT Pub. Date: Feb. 13, 2020

(65) Prior Publication Data
US 2020/0139724 A1   May 7, 2020

(51) Int. Cl.
*B41J 2/045* (2006.01)
*B41J 2/36* (2006.01)
*B41J 2/325* (2006.01)

(52) U.S. Cl.
CPC .............. *B41J 2/36* (2013.01); *B41J 2/0458* (2013.01); *B41J 2/04591* (2013.01); *B41J 2/325* (2013.01);

(Continued)

(58) Field of Classification Search
CPC ........ B41J 2/0458; B41J 2/36; B41J 2/04591; B41J 2/355; B41J 2202/17
See application file for complete search history.

(56) References Cited

U.S. PATENT DOCUMENTS 6,798,433 B1   9/2004 Sun et al.

FOREIGN PATENT DOCUMENTS

| JP | 7-304202 A | 11/1995 |
|---|---|---|
| JP | 8-197769 A | 8/1996 |

OTHER PUBLICATIONS

International Search Report for PCT/JP2018/029740 (PCT/ISA/210) dated Oct. 2, 2018.

(Continued)

*Primary Examiner* — Lamson D Nguyen
(74) *Attorney, Agent, or Firm* — Birch, Stewart, Kolasch & Birch, LLP.

(57) ABSTRACT

There are provided a thermal transfer printer and a method for producing a printed matter capable of suppressing deterioration in printing quality. A first energizing pulse is generated at the beginning of one line period. The first energizing pulse causes each heating element to perform offset heating. Second energizing pulses whose number corresponds to a tone level are generated in one line period. The second energizing pulses cause each heating element to perform heating. When the timings at which the first energizing pulse and the second energizing pulses are generated can be evenly distributed within one line period, the timings are evenly distributed within one line period. When the timings cannot be evenly distributed within one line period, the timings are distributed within one line period such that an unevenly distributed portion included in the timings is arranged in an initial period of one line period.

4 Claims, 12 Drawing Sheets

(52) U.S. Cl.
CPC ... *B41J 2202/17* (2013.01); *H04N 2201/0082* (2013.01)

(56) References Cited

OTHER PUBLICATIONS

Extended European Search Report issued in corresponding European Application No. 18871819.1 dated Oct. 29, 2019.

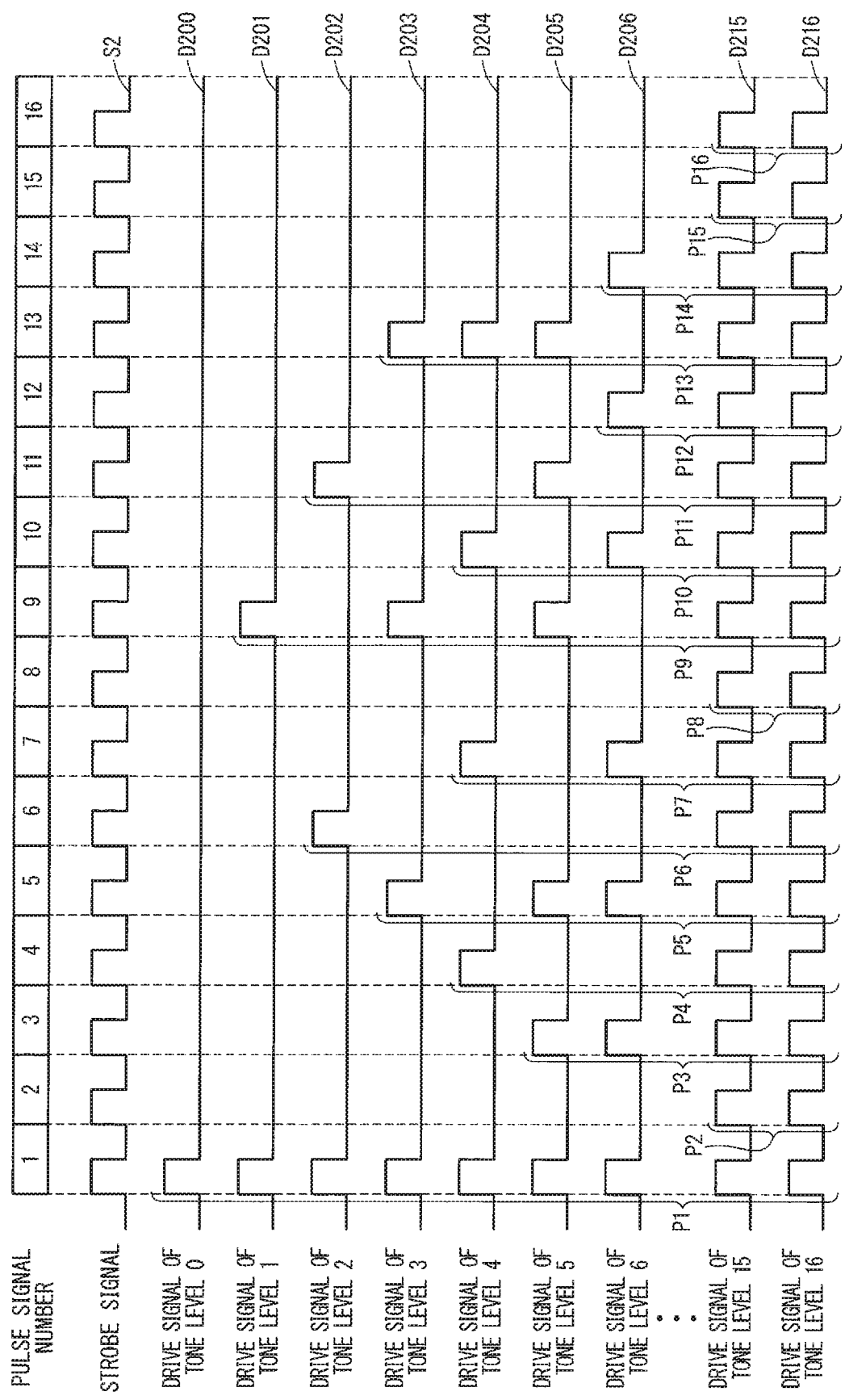

FIG. 8

| d | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | ON | OFF | OFF | OFF | OFF | OFF | OFF | OFF | OFF | OFF | OFF | OFF | OFF | OFF | OFF | OFF |
| 2 | ON | OFF | OFF | OFF | OFF | OFF | OFF | OFF | OFF | OFF | OFF | OFF | OFF | OFF | OFF | OFF |
| 3 | ON | OFF | OFF | OFF | OFF | OFF | OFF | OFF | ON | OFF | OFF | OFF | OFF | OFF | OFF | OFF |
| 4 | ON | OFF | OFF | OFF | OFF | OFF | OFF | OFF | OFF | OFF | OFF | OFF | ON | OFF | OFF | OFF |
| 5 | ON | OFF | OFF | ON | OFF | OFF | OFF | OFF | OFF | ON | OFF | OFF | ON | OFF | OFF | OFF |
| 6 | ON | OFF | ON | OFF | ON | OFF | OFF | OFF | ON | OFF | ON | OFF | OFF | ON | OFF | OFF |
| 7 | ON | OFF | ON | OFF | ON | OFF | ON | OFF | OFF | OFF | OFF | ON | ON | OFF | OFF | OFF |
| 8 | ON | OFF | ON | OFF | ON | OFF | ON | OFF | ON | OFF | ON | OFF | ON | OFF | OFF | OFF |
| 9 | ON | ON | ON | OFF | ON | OFF | ON | OFF | OFF | ON | ON | OFF | ON | OFF | OFF | OFF |
| 10 | ON | ON | ON | OFF | ON | ON | ON | OFF | ON | ON | ON | OFF | ON | ON | OFF | OFF |
| 11 | ON | ON | ON | ON | ON | ON | ON | OFF | ON | ON | ON | ON | ON | OFF | ON | OFF |
| 12 | ON | ON | ON | ON | ON | ON | ON | OFF | ON | ON | ON | ON | ON | ON | ON | OFF |
| 13 | ON | ON | ON | ON | ON | ON | ON | ON | ON | ON | ON | ON | ON | ON | ON | OFF |
| 14 | ON | ON | ON | ON | ON | ON | ON | ON | ON | ON | ON | ON | ON | ON | ON | OFF |
| 15 | ON | ON | ON | ON | ON | ON | ON | ON | ON | ON | ON | ON | ON | ON | ON | OFF |
| 16 | ON | ON | ON | ON | ON | ON | ON | ON | ON | ON | ON | ON | ON | ON | ON | ON |
| 17 | ON | ON | ON | ON | ON | ON | ON | ON | ON | ON | ON | ON | ON | ON | ON | ON |

PULSE SIGNAL NUMBER

| d | 1a | 1b | 2a | 2b | 3a | 3b | 4a | 4b | 5a | 5b | 6a | 6b | 7a | 7b |
|---|---|---|---|---|---|---|---|---|---|---|---|---|---|---|
| 1 | 1 | 1 | 0 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 1 | 0 | 0 |
| 3 | 1 | 1 | 0 | 0 | 0 | 0 | 0 | 1 | 0 | 0 | 0 | 0 | 0 | 1 |
| 4 | 1 | 1 | 0 | 0 | 0 | 1 | 0 | 0 | 0 | 1 | 0 | 0 | 0 | 1 |
| 5 | 1 | 1 | 0 | 0 | 1 | 0 | 0 | 1 | 0 | 0 | 0 | 1 | 0 | 0 |
| 6 | 1 | 1 | 0 | 0 | 1 | 0 | 1 | 0 | 0 | 1 | 0 | 0 | 1 | 0 |
| 7 | 1 | 1 | 0 | 0 | 1 | 0 | 1 | 1 | 1 | 0 | 0 | 1 | 0 | 1 |
| 8 | 1 | 1 | 0 | 1 | 0 | 0 | 1 | 0 | 1 | 1 | 0 | 1 | 0 | 1 |
| 9 | 1 | 1 | 0 | 1 | 1 | 0 | 1 | 1 | 0 | 1 | 1 | 0 | 0 | 1 |
| 10 | 1 | 1 | 0 | 1 | 1 | 1 | 0 | 0 | 1 | 0 | 1 | 1 | 1 | 1 |
| 11 | 1 | 1 | 0 | 1 | 1 | 1 | 1 | 1 | 1 | 1 | 1 | 1 | 0 | 1 |
| 12 | 1 | 1 | 0 | 1 | 1 | 1 | 1 | 0 | 1 | 1 | 1 | 1 | 0 | 1 |
| 13 | 1 | 1 | 1 | 1 | 1 | 1 | 1 | 1 | 1 | 0 | 1 | 1 | 1 | 1 |
| 14 | 1 | 1 | 1 | 1 | 1 | 1 | 1 | 1 | 1 | 1 | 1 | 1 | 1 | 1 |
| 15 | 1 | 1 | 1 | 1 | 1 | 1 | 1 | 1 | 1 | 1 | 1 | 1 | 1 | 1 |
| 16 | 1 | 1 | 1 | 1 | 1 | 1 | 1 | 1 | 1 | 1 | 1 | 1 | 1 | 1 |
| 17 | 1 | 1 | 1 | 1 | 1 | 1 | 1 | 1 | 1 | 1 | 1 | 1 | 1 | 1 |

PULSE SIGNAL NUMBER

| d | \multicolumn{18}{c|}{PULSE SIGNAL NUMBER} |
|---|---|---|---|---|---|---|---|---|---|---|---|---|---|---|---|---|---|---|
|   | 8a | 8b | 9a | 9b | 10a | 10b | 11a | 11b | 12a | 12b | 13a | 13b | 14a | 14b | 15a | 15b | 16a | 16b |
| 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 1 | 0 | 0 | 0 | 0 | 0 | 1 | 0 | 0 | 0 | 0 | 0 | 0 |
| 4 | 0 | 0 | 0 | 0 | 1 | 0 | 0 | 0 | 1 | 0 | 0 | 0 | 0 | 1 | 0 | 0 | 0 | 0 |
| 5 | 1 | 0 | 0 | 0 | 1 | 0 | 0 | 1 | 0 | 0 | 0 | 1 | 0 | 0 | 1 | 0 | 0 | 0 |
| 6 | 0 | 1 | 0 | 0 | 0 | 0 | 1 | 0 | 0 | 1 | 0 | 0 | 0 | 0 | 0 | 1 | 0 | 0 |
| 7 | 0 | 1 | 0 | 0 | 1 | 0 | 0 | 0 | 1 | 0 | 0 | 1 | 0 | 1 | 0 | 1 | 0 | 0 |
| 8 | 0 | 1 | 0 | 0 | 0 | 0 | 1 | 0 | 1 | 0 | 1 | 1 | 1 | 0 | 0 | 1 | 0 | 0 |
| 9 | 0 | 1 | 1 | 0 | 0 | 1 | 1 | 1 | 1 | 1 | 0 | 0 | 1 | 0 | 1 | 0 | 1 | 0 |
| 10 | 0 | 0 | 0 | 1 | 1 | 0 | 1 | 0 | 0 | 1 | 1 | 1 | 1 | 1 | 1 | 0 | 1 | 0 |
| 11 | 1 | 1 | 1 | 1 | 1 | 1 | 1 | 1 | 0 | 0 | 1 | 0 | 1 | 0 | 0 | 1 | 1 | 0 |
| 12 | 1 | 1 | 0 | 1 | 1 | 1 | 1 | 0 | 1 | 1 | 1 | 1 | 1 | 1 | 1 | 0 | 1 | 0 |
| 13 | 1 | 1 | 0 | 1 | 1 | 1 | 1 | 1 | 1 | 1 | 0 | 1 | 1 | 1 | 1 | 1 | 1 | 0 |
| 14 | 1 | 1 | 0 | 1 | 1 | 1 | 1 | 1 | 1 | 1 | 1 | 1 | 1 | 1 | 1 | 1 | 1 | 0 |
| 15 | 1 | 1 | 1 | 1 | 1 | 1 | 1 | 1 | 1 | 1 | 1 | 1 | 1 | 1 | 1 | 1 | 1 | 1 |
| 16 | 1 | 1 | 1 | 1 | 1 | 1 | 1 | 1 | 1 | 1 | 1 | 1 | 1 | 1 | 1 | 1 | 1 | 1 |
| 17 | 1 | 1 | 1 | 1 | 1 | 1 | 1 | 1 | 1 | 1 | 1 | 1 | 1 | 1 | 1 | 1 | 1 | 1 |

THERMAL TRANSFER PRINTER AND METHOD FOR PRODUCING PRINTED MATTER

TECHNICAL FIELD

The present invention relates to a thermal transfer printer and a method for producing a printed matter.

BACKGROUND ART

A thermal transfer printer includes a thermal head. An ink ribbon and paper are mounted to the thermal transfer printer. The ink ribbon has a base made of a plastic film and has yellow (Y), magenta (M), and cyan (C) ink surfaces. The Y, M and C ink surfaces are respectively composed of Y, M and C inks applied on the base. When the thermal transfer printer prints an image on paper, the thermal head heats the ink ribbon. Thus, Y, M and C inks are thermally transferred to the paper from the ink ribbon in this order. As a result, an image in which monochrome Y, M and C images are superimposed on each other is printed on the paper. The thermal transfer printer controls the density of an image by an amount of heating of the thermal head.

The thermal head includes a plurality of heating elements. The plurality of heating elements is linearly arranged. With this configuration, the thermal head prints an image composed of a plurality of lines on paper by repeating printing of one line constituting the image. The thermal transfer printer controls the density of one line by the amount of heating of the thermal head in one line period in which printing of one line is performed.

There may be the case where the thermal transfer printer generates energizing pulses for causing each heating element included in the plurality of heating elements to perform heating and controls the amount of heating of each heating element in one line period based on the number of energizing pulses generated in one line period. In this case, the thermal transfer printer reduces the density of the image by decreasing the number of energizing pulses generated in one line period, and increases the density of the image by increasing the number of energizing pulses generated in one line period.

The thermal printer disclosed in Patent Document 1 and the printing apparatus disclosed in Patent Document 2 are examples of a conventional thermal transfer printer.

In the thermal printer disclosed in Patent Document 1, an energizing pulse train to a thermal head according to the density of image data is divided into a plurality of groups, and recording is carried out while being distributed in a period in which recording paper is moved by one line.

The printing apparatus disclosed in Patent Document 2 outputs tone data stored in a lookup table to a thermal head control circuit. In addition, the printing apparatus divides a printing process for one line into two blocks for each arbitrary tone, and prints all the tones reproducible by the printer as a whole.

PRIOR ART DOCUMENTS

Patent Documents

Patent Document 1: Japanese Patent Application Laid-Open No. 08-197769
Patent Document 2: Japanese Patent Application Laid-Open No. 07-304202

SUMMARY

Problem to be Solved by the Invention

When the density of an image is low, the conventional thermal transfer printer decreases the number of energizing pulses generated in one line period as described above to sparsely generate energizing pulses. Therefore, in the conventional thermal transfer printer, when the density of an image is low, variations in color development may occur in the image, a gap may be generated between each line constituting the image and a line which constitutes the image and which is adjacent to the line, and thus, deterioration in printing quality such as uneven printing may occur, depending on a distribution of timings at which energizing pulses are generated. This problem is particularly conspicuous at a printing start portion of the image where a color development is likely to be difficult due to low temperature of the thermal head.

On the other hand, when the density of an image is high, the conventional thermal transfer printer increases the number of energizing pulses generated in one line period as described above to densely generate energizing pulses. For this reason, in the conventional thermal transfer printer, when the density of an image is high, the ink ribbon is continuously heated, which may cause great thermal damage on the ink ribbon. As a result, when the density of the image is high, the base shrinks thermally, and deterioration in printing quality such as a printing defect may occur. Further, peeling failure of paper from the ink ribbon may occur, which may result in deterioration in printing quality such as reduction in glossiness of the printing surface. This problem also occurs when the conventional thermal transfer printer continuously prints images on paper.

The present invention has been made in view of these problems. In order to solve the problem, the present invention provides a thermal transfer printer and a method for producing a printed matter capable of suppressing deterioration in printing quality such as uneven printing, printing defects, and reduction in glossiness of a printing surface.

Means to Solve the Problem

The present invention is directed to a thermal transfer printer.

The thermal transfer printer includes a thermal head and a generation unit.

The thermal head includes a plurality of heating elements. The plurality of heating elements is linearly arranged.

The generation unit generates a first energizing pulse at the beginning of one line period in which printing of one line is performed. The first energizing pulse causes each heating element included in the plurality of heating elements to perform offset heating.

The generation unit generates, in one line period, second energizing pulses whose number corresponds to a tone level. The second energizing pulses cause each heating element to perform heating.

When the timings at which the first energizing pulse and the second energizing pulses are generated can be evenly distributed within one line period, the generation unit evenly distributes the timings within one line period. On the other hand, if the timings cannot be evenly distributed within one line period, the generation unit distributes the timings within one line period such that an unevenly distributed portion included in the timings is arranged in an initial period of one line period.

The present invention is also directed to a method for producing a printed matter using a thermal transfer printer.

Effects of the Invention

According to the present invention, the timings at which the first energizing pulse and the second energizing pulses are generated are distributed within one line period, and the timing at which the first energizing pulse is generated and the unevenly distributed portion included in the timings at which the first energizing pulse and the second energizing pulses are generated are arranged in the initial period of one line period. Therefore, even when the density of an image is low, deterioration in printing quality such as uneven printing can be suppressed. The deterioration in printing quality such as uneven printing can be effectively suppressed particularly at a printing start portion of an image where a color development is likely to be difficult due to low temperature of each heating element.

Also, according to the present invention, the timings at which the first energizing pulse and the second energizing pulses are generated are distributed within one line period. Therefore, even when the density of an image printed on paper is high and printing is continuously performed, continuous heating of an ink ribbon can be suppressed, so that deterioration in printing quality such as printing defects and reduction in glossiness of a printing surface can be suppressed.

The objects, features, aspects, and advantages of the present invention will become more apparent from the following detailed description and the accompanying drawings.

BRIEF DESCRIPTION OF DRAWINGS

FIG. 7 is a timing chart illustrating a strobe signal and a drive signal generated in one line period in which the thermal transfer printer in the second embodiment performs printing of one line.

FIG. 8 is a diagram illustrating a lookup table (LUT) stored in a memory provided in the thermal transfer printer in the second embodiment.

FIG. 11 is a diagram illustrating an LUT stored in a memory provided in the thermal transfer printer in the third embodiment.

FIG. 12 is a diagram illustrating the LUT stored in the memory provided in the thermal transfer printer in the third embodiment.

DESCRIPTION OF EMBODIMENTS

1 First Embodiment 1.1 Thermal Transfer Printer

Figure 1:
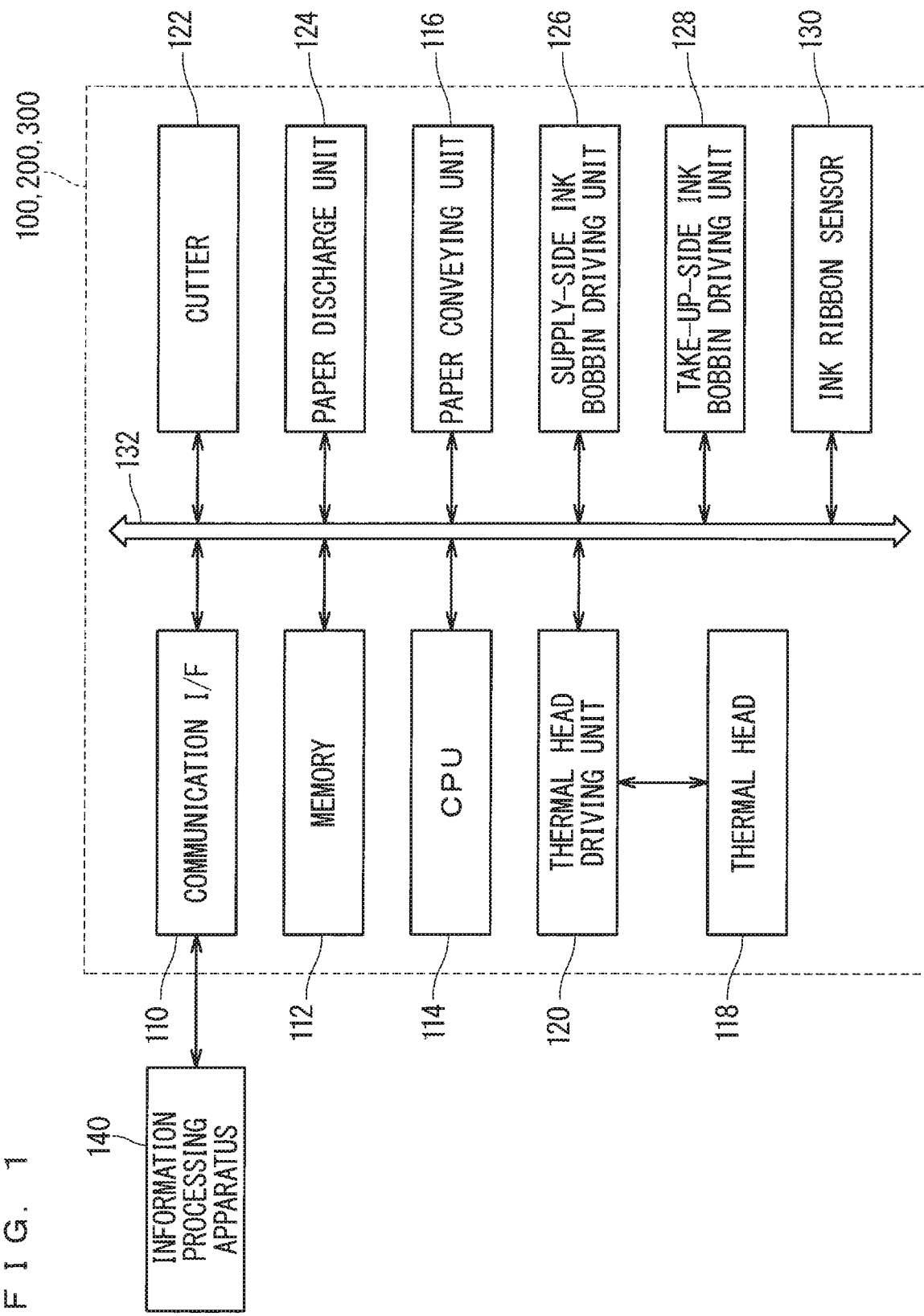
FIG. 1 is a block diagram illustrating a thermal transfer printer according to first, second, and third embodiments.
Figure 2:
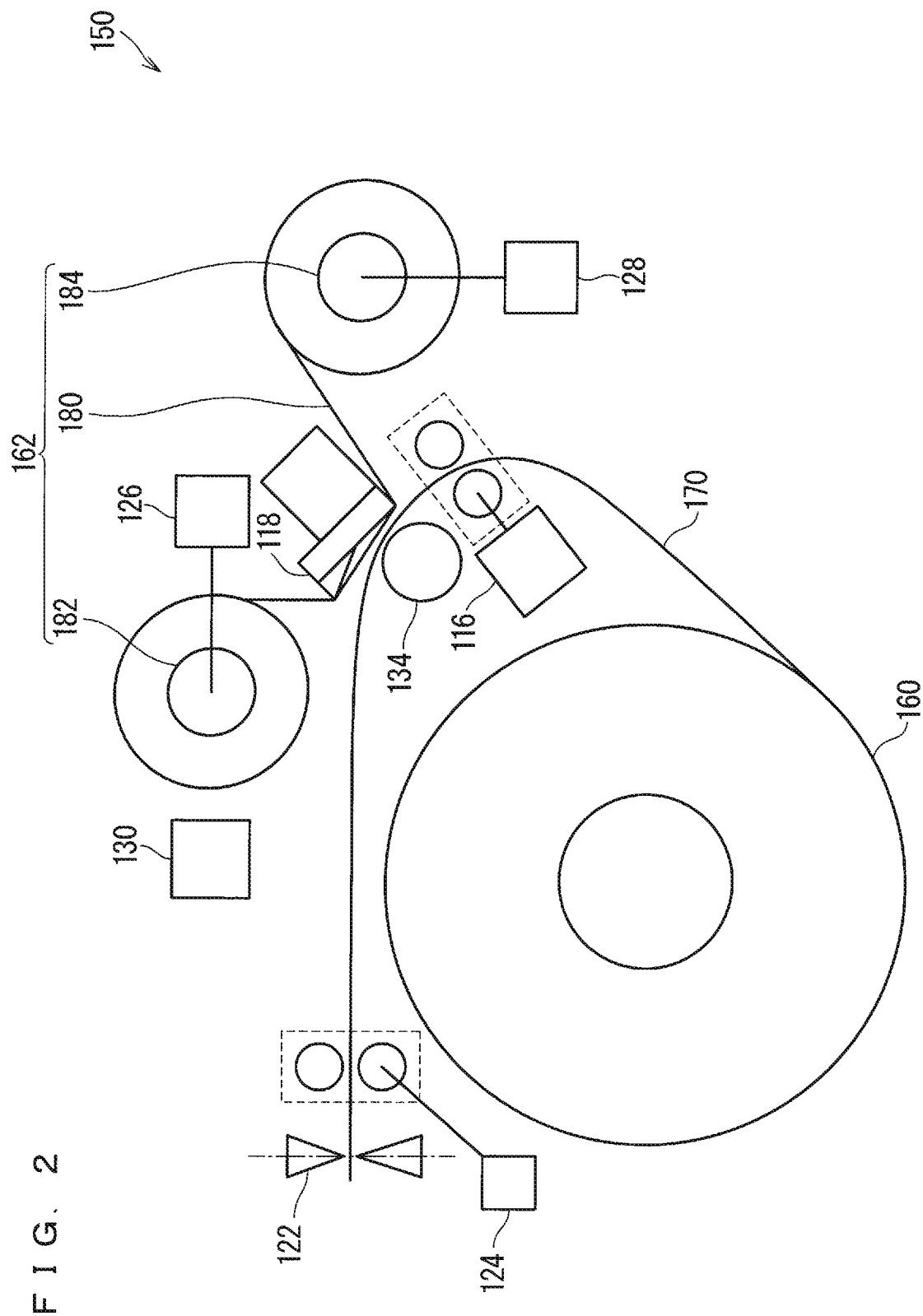
FIG. 2 is a schematic view illustrating a printing mechanism provided in the thermal transfer printer in the first, second, and third embodiments.

FIG. 1 is a block diagram illustrating a thermal transfer printer according to the first embodiment. FIG. 2 is a schematic view illustrating a printing mechanism provided in the thermal transfer printer in the first embodiment.

A thermal transfer printer 100 illustrated in FIG. 1 includes a communication interface (communication I/F) 110, a memory 112, a central processing unit (CPU) 114, a paper conveying unit 116, a thermal head 118, a thermal head driving unit 120, a cutter 122, a paper discharge unit 124, a supply-side ink bobbin driving unit 126, a take-up-side ink bobbin driving unit 128, an ink ribbon sensor 130, and a data bus 132. The thermal transfer printer 100 may include elements other than these elements.

The communication I/F 110 receives image data and information about printing conditions from an information processing apparatus 140. The information processing apparatus 140 is a personal computer or the like installed outside the thermal transfer printer 100. The information to be received about printing conditions includes a print size and the like.

The memory 112 includes a temporary storage memory and a nonvolatile memory. The temporary storage memory is a random access memory (RAM) or the like. The nonvolatile memory is a flash memory or the like. The temporary storage memory temporarily stores the received image data and information about the printing conditions and the like. The nonvolatile memory stores control programs, initial setting values, and the like.

The CPU 114 executes a control program. Through execution of the control program, the CPU 114 processes the received image data, converts the image data into printing data, and controls a printing mechanism described below.

A printing mechanism 150 illustrated in FIG. 2 includes the paper conveying unit 116, the thermal head 118, the cutter 122, the paper discharge unit 124, the supply-side ink bobbin driving unit 126, the take-up-side ink bobbin driving unit 128, the ink ribbon sensor 130, and a platen roller 134.

Roll paper 160 and an ink cassette 162 are attached to the printing mechanism 150. The roll paper 160 includes rolled paper 170. The ink cassette 162 includes an ink ribbon 180, a supply-side ink bobbin 182, and a take-up-side ink bobbin 184. A portion of the ink ribbon 180 that is not yet used for printing is wound around the supply-side ink bobbin 182. A portion of the ink ribbon 180 which has already been used for printing is wound around the take-up-side ink bobbin 184. The ink ribbon 180 has a base made of a plastic film, has ink surfaces of yellow (Y), magenta (M) and cyan (C), and has an overcoat (OP) surface. The Y, M and C ink surfaces are respectively composed of Y, M and C inks applied on the base. The OP surface is made of an OP material applied to the base. The applied OP material is used to impart light resistance and abrasion resistance to a printing surface.

The paper conveying unit 116 draws out the paper 170 from the roll paper 160 and conveys the drawn paper 170.

The thermal head 118 and the platen roller 134 press the paper 170 and the ink ribbon 180 under pressure. The thermal head 118 heats the ink ribbon 180.

The thermal head 118 includes a plurality of heating elements. The plurality of heating elements is linearly arranged.

The thermal head driving unit 120 drives the thermal head 118.

The cutter 122 cuts the paper 170 and creates a piece of paper having a prescribed size. The prescribed size is, for example, an L size of 89 mm×127 mm.

The paper discharge unit 124 discharges the piece of paper to the outside of the thermal transfer printer 100.

The supply-side ink bobbin driving unit 126 rotationally drives the supply-side ink bobbin 182.

The take-up-side ink bobbin driving unit 128 rotationally drives the take-up-side ink bobbin 184.

The ink ribbon sensor 130 detects the position of the ink ribbon 180.

The data bus 132 transmits data exchanged between elements included in the thermal transfer printer 100.

1.2 Basic Printing Operation of Thermal Transfer Printer

When the thermal transfer printer 100 prints an image on the paper 170, the communication I/F 110 receives the image data and the information about printing conditions which are transmitted from the information processing apparatus 140.

Subsequently, the memory 112 stores the image data and the information about printing conditions which have been received.

Subsequently, the CPU 114 converts the stored image data into printing data.

Further, the paper conveying unit 116 draws out the paper 170 from the roll paper 160, and conveys the drawn paper 170 to the thermal head 118. Thus, the thermal head 118 and the platen roller 134 can press the conveyed paper 170 and the ink ribbon 180 under pressure.

Subsequently, the thermal transfer printer 100 prints monochrome Y, C, and M images and forms an OP. As a result, the thermal transfer printer 100 prints, on the paper 170, an image in which monochrome Y, C, and M images and the OP are superimposed on each other.

The thermal transfer printer 100 thermally transfers the Y, M and C inks from the ink ribbon 180 to the paper 170, when printing the monochrome Y, M, and C images, respectively. Further, when forming the OP, the thermal transfer printer 100 thermally transfers the OP material from the ink ribbon 180 to the paper 170.

While the thermal transfer printer 100 prints monochrome Y, M, and C images and forms the OP, the paper conveying unit 116 conveys the paper 170 in the forward direction. Further, the paper conveying unit 116 conveys the paper 170 in the reverse direction during the period from when the thermal transfer printer 100 finishes the printing of the monochrome Y image till it starts the printing of the monochrome M image, during the period from when the thermal transfer printer 100 finishes the printing of the monochrome M image till it starts the printing of the monochrome C image, and during the period from when the thermal transfer printer 100 finishes the printing of the monochrome C image till it starts the formation of the OP.

When printing each of the monochrome Y, M, and C images, the thermal transfer printer 100 repeatedly performs printing of one line for printing one line constituting an image represented by image data on paper 170.

The CPU 114 functions as a generation unit that generates energizing pulses. When the thermal transfer printer 100 performs printing of one line, the CPU 114 generates an energizing pulse for causing the thermal head 118 to perform heating based on one-line printing data included in the printing data obtained through the conversion. Subsequently, the thermal head driving unit 120 energizes the thermal head 118 based on the generated energizing pulse. As a result, heat corresponding to the generated energizing pulse is applied to the ink ribbon 180, and the amount of ink corresponding to the generated energizing pulse is thermally transferred from the ink ribbon 180 to the paper 170, and thus, one line having a density corresponding to the generated energizing pulse is printed on the paper 170.

Further, while the thermal transfer printer 100 repeatedly performs printing of one line, the paper conveying unit 116 conveys the paper 170 in the forward direction.

After the thermal transfer printer 100 prints an image on the paper 170, the cutter 122 cuts the paper 170 on which the image has been printed to produce a printed matter composed of a piece of paper which has the image printed thereon and which has a prescribed size.

Subsequently, the paper discharge unit 124 discharges the produced printed matter to the outside of the thermal transfer printer 100.

1.3 Control of Amount of Heating of Thermal Head in One Line Period

Figure 3:
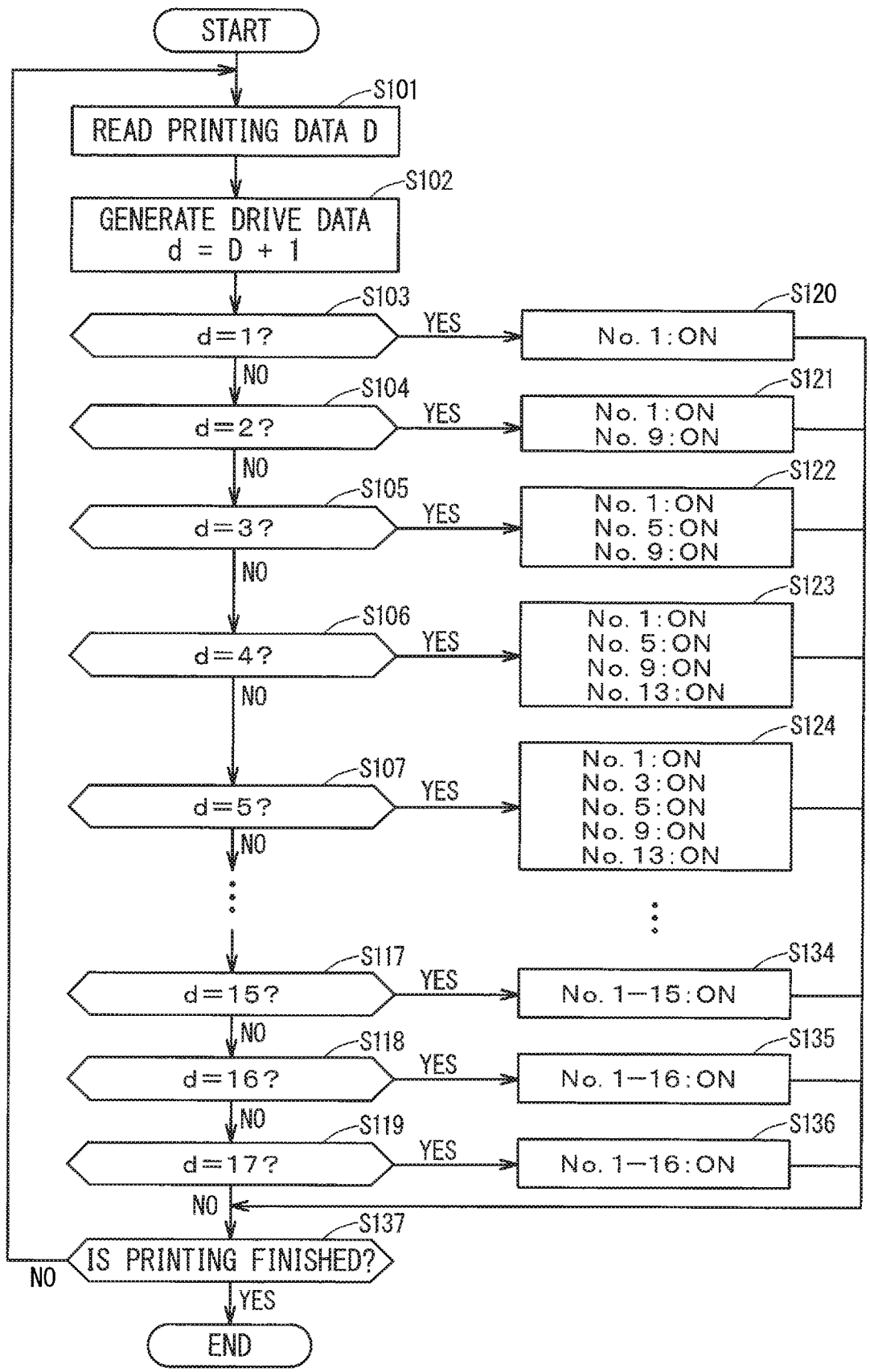
FIG. 3 is a flowchart illustrating a flow of control of an amount of heating of a thermal head in one line period in which the thermal transfer printer in the first embodiment performs printing of one line.
Figure 4:
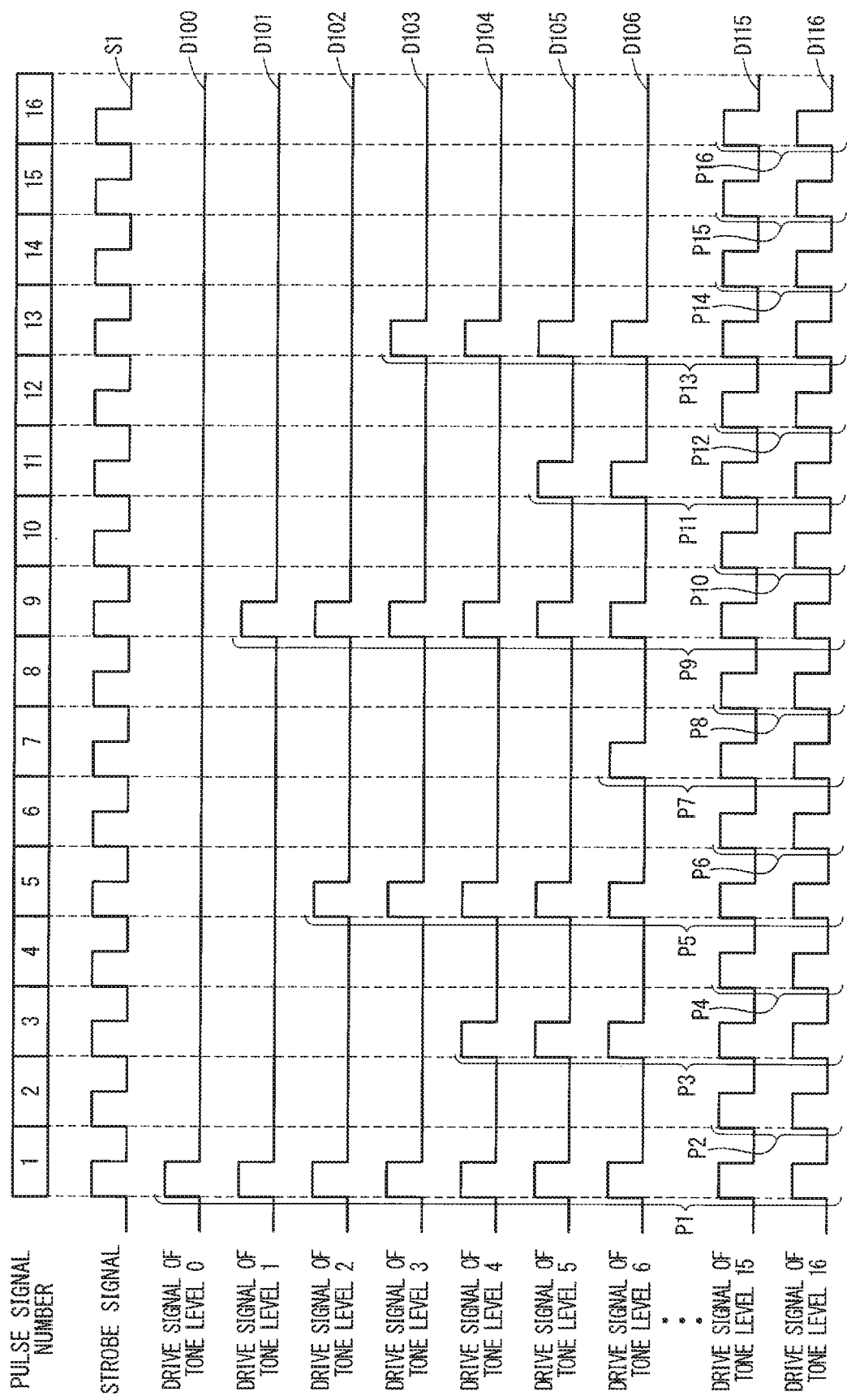
FIG. 4 is a timing chart illustrating a strobe signal and a drive signal generated in one line period in which the thermal transfer printer in the first embodiment performs printing of one line.
Figure 5:
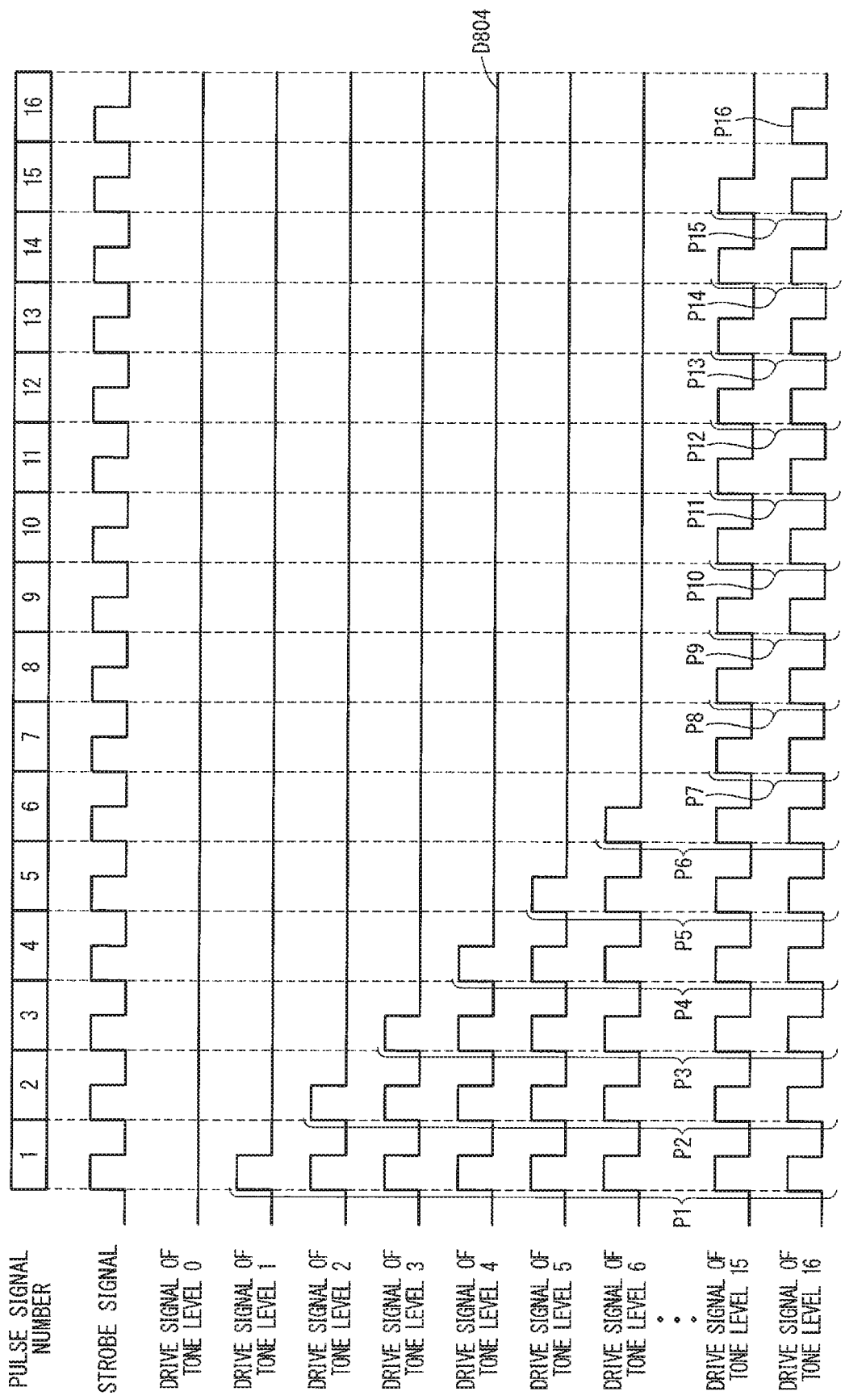
FIG. 5 is a timing chart illustrating a strobe signal and a drive signal generated in one line period in which a thermal transfer printer in Reference Example 1 performs printing of one line.
Figure 6:
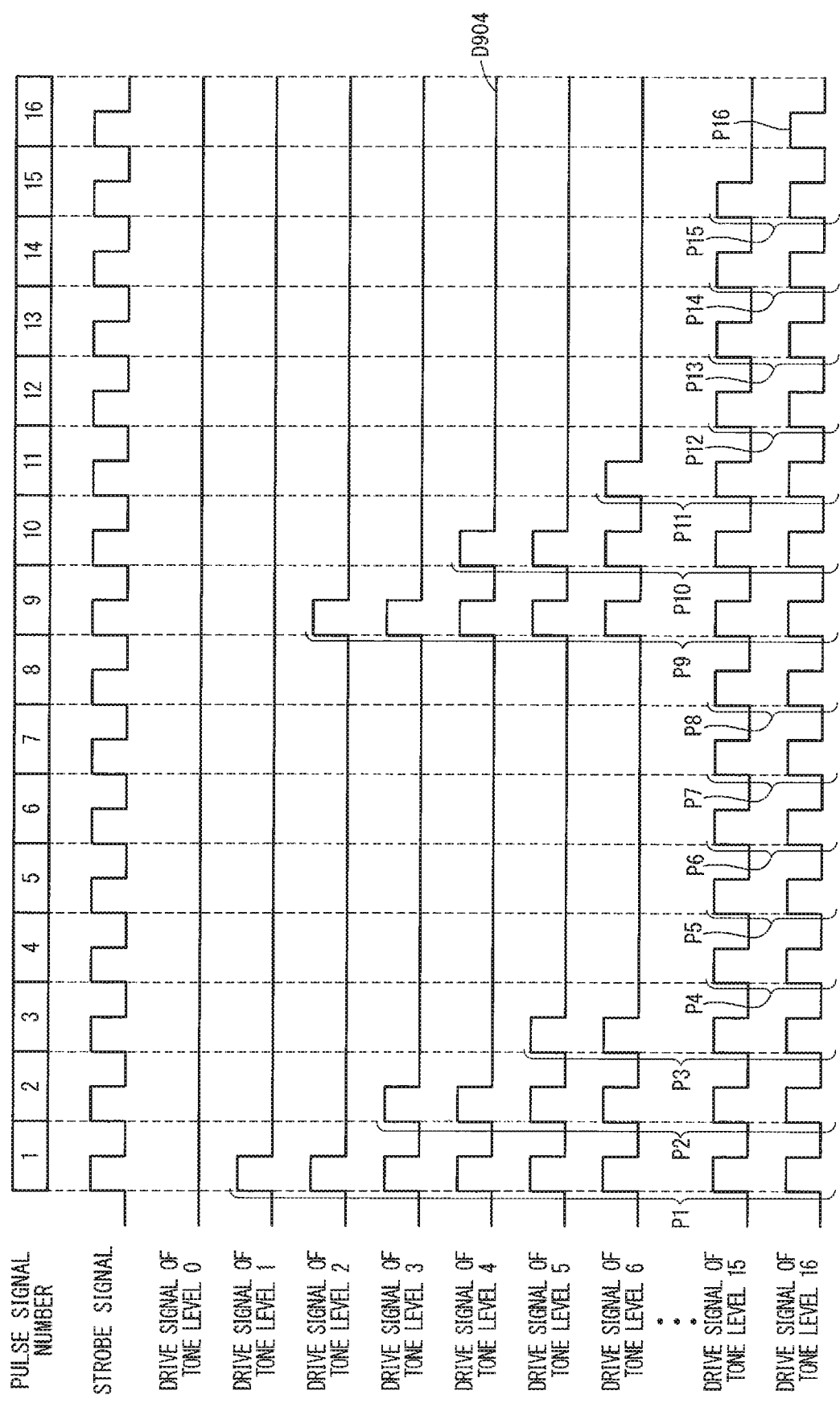
FIG. 6 is a timing chart illustrating a strobe signal and a drive signal generated in one line period in which a thermal transfer printer in Reference Example 2 performs printing of one line.

FIG. 3 is a flowchart illustrating a flow of control of an amount of heating of the thermal head in one line period in which the thermal transfer printer in the first embodiment performs printing of one line. FIG. 4 is a timing chart illustrating a strobe signal and a drive signal generated in one line period in which the thermal transfer printer in the first embodiment performs printing of one line. FIGS. 5 and 6 are timing charts respectively illustrating a strobe signal and a drive signal generated in one line period in which thermal transfer printers in Reference Examples 1 and 2 perform printing of one line. The horizontal axis of the timing chart in each of FIGS. 4, 5 and 6 is a time axis. The timing charts shown in FIGS. 5 and 6 are provided for comparison with the timing chart shown in FIG. 4 and have a time axis common to the time axis of the timing chart shown in FIG. 4.

The amount of heating of each of the heating elements included in the plurality of heating elements provided in the thermal head 118 indicates an amount of heat applied to the ink ribbon 180 by each heating element. The amount of heating of each heating element in one line period is controlled by the number of energizing pulses generated in one line period.

For convenience of description, a tone level expressed by the image data is assumed to be any of tones 0 to 16 in the first embodiment. Further, the maximum value of energizing pulses generated in one line period is assumed to be sixteen. Therefore, when each heating element does not perform heating, the number of energizing pulses generated in one line period is zero. In addition, when each heating element performs heating most strongly, the number of energizing pulses generated in one line period is sixteen.

Further, in the first embodiment, control of the amount of heating of each heating element in one line period due to the temperature of the thermal head 118 and heat accumulation due to past printing is not performed.

In step S101 shown in FIG. 3, the CPU 114 reads printing data D included in one-line printing data after the thermal transfer printer 100 starts printing of an image.

In subsequent step S102, the CPU 114 adds an offset value to the printing data D to generate drive data d. The offset value to be added indicates the number of first energizing pulses for causing each heating element to perform offset heating at the beginning of one line period. Offset heating means heating which is performed regardless of a tone level and the drive data d. Therefore, regardless of the tone level and the drive data d, the CPU 114 generates first energizing pulses, the number of which is equivalent to the offset value, at the beginning of one line period. In the first embodiment, the offset value is 1, the generated drive data d is D+1, and the number of first energizing pulses is one. However, the offset value may be 2 or more.

The memory 112 stores a lookup table (LUT) as a comparison table. The LUT contains waveforms of drive signals D100 to D116 which are shown in FIG. 4 and which respectively correspond to specific values 1 to 17 of the drive data d. The drive signals D100 to D116 are drive signals of tones 0 to 16, respectively. Each of the drive signals D100 to D116 includes at least one energizing pulse selected from energizing pulses P1 to P16 respectively generated in synchronism with the first to the sixteenth rises of the strobe signal S1 shown in FIG. 4. Pulse signal numbers No.1 to No.16 are assigned to the energizing pulses P1 to P16, respectively.

In subsequent steps S103 to S136, the CPU 114 generates a drive signal corresponding to the drive data d according to the stored LUT, and inputs the generated drive signal to the thermal head driving unit 120. Further, the thermal head driving unit 120 energizes each heating element according to the inputted drive signal. As a result, the amount of heating of each heating element is controlled based on the drive signal. Instead of generating the drive signal according to the LUT, the drive signal may be generated according to a mathematical formula, generated by a logic circuit, or by other methods.

For example, when determining in step S103 that the drive data d is 1, the CPU 114 generates the first energizing pulse P1 in step S120. Accordingly, the CPU 114 generates the drive signal D100 of tone 0 including the first energizing pulse P1. The first energizing pulse P1 is generated at the beginning of one line period and causes each heating element to perform offset heating. The beginning of one line period indicates the first timing from among a plurality of timings at which energizing pulses can be generated during one line period, and indicates the timing started with the first rise of the plurality of rises of the strobe signal S1.

When determining in step S104 that the drive data d is 2, the CPU 114 generates the first energizing pulse P1 and the second energizing pulse P9 in step S121. As a result, the CPU 114 generates the drive signal D101 of tone 1 including the first energizing pulse P1 and the second energizing pulse P9. The first energizing pulse P1 is generated at the beginning of one line period and causes each heating element to perform offset heating. The second energizing pulse P9 is generated in the middle of one line period, and causes each heating element to perform heating.

The periods following the timings of generation of the first energizing pulse P1 and the second energizing pulse P9 and having no energizing pulse being generated have the same length. Therefore, the timings at which the first energizing pulse P1 and the second energizing pulse P9 are generated are evenly distributed within one line period. That is, when the timings at which the first energizing pulse P1 and the second energizing pulse P9 generated in step S121 are generated can be evenly distributed within one line period, the CPU 114 evenly distributes such timings within one line period.

When determining in step S105 that the drive data d is 3, the CPU 114 generates the first energizing pulse P1 and the second energizing pulses P5 and P9 in step S122. As a result, the CPU 114 generates the drive signal D102 of tone 2 including the first energizing pulse P1 and the second energizing pulses P5 and P9. The first energizing pulse P1 is generated at the beginning of one line period and causes each heating element to perform offset heating. The second energizing pulse P9 is generated in the middle of one line period, and causes each heating element to perform heating. The second energizing pulse P5 is generated between the beginning of one line period and the middle of one line period, and causes each heating element to perform heating.

The periods following the timings of generation of the first energizing pulse P1 and the second energizing pulses P5 and P9 and having no energizing pulse being generated do not have the same length. Therefore, the timings at which the first energizing pulse P1 and the second energizing pulses P5 and P9 are generated are not evenly distributed within one line period. Also, the unevenly distributed portion included in the timings is arranged in an initial period of one line period. That is, when the timings at which the first energizing pulse P1 and the second energizing pulses P5 and P9 generated in step S122 are generated cannot be evenly distributed within one line period, the CPU 114 distributes such timings within one line period such that the unevenly distributed portion included in the timings is arranged in the initial period of one line period. The initial period of one line period indicates a period including the first two or more timings included in a plurality of timings at which energizing pulses can be generated during one line period, and also indicates a period including two or more timings respectively started with the first two or more rises of the plurality of rises of the strobe signal S1.

When determining in step S106 that the drive data d is 4, the CPU 114 generates the first energizing pulse P1 and the second energizing pulses P5, P9, and P13 in step S123.

In step S123, the CPU 114 also evenly distributes the timings at which the first energizing pulse P1 and the second energizing pulses P5, P9, and P13 are generated within one line period, as in step S121.

When determining in step S107 that the drive data d is 5, the CPU 114 generates the first energizing pulse P1 and the second energizing pulses P3, P5, P9, and P13 in step S124.

In step S124, the CPU 114 also distributes the timings at which the first energizing pulse P1 and the second energizing pulses P3, P5, P9, and P13 are generated within one line period such that the unevenly distributed portion included in the timings is arranged in the initial period of one line period, as in step S122.

When determining in step S117 that the drive data d is 15, the CPU 114 generates the first energizing pulse P1 and the second energizing pulses P2 to P15 in step S134.

When determining in step S118 that the drive data d is 16, the CPU 114 generates the first energizing pulse P1 and the second energizing pulses P2 to P16 in step S135.

When determining in step S119 that the drive data d is 17, the CPU 114 also generates the first energizing pulse P1 and the second energizing pulses P2 to P16 in step S136.

As can be understood from steps S103 to S136, the CPU 114 generates second energizing pulses whose number corresponds to tone levels.

Further, as can be understood from steps S118 and S119, when the tone level is equal to or more than a threshold value 15 and the drive data d is equal to or more than a threshold value 16, the CPU 114 saturates the total of the number of first energizing pulses and the number of second energizing pulses at sixteen. The reason why the saturation of the total is allowed when the tone level is equal to or larger than the threshold value 15 is because human vision can easily recognize a tone difference when the density is low, whereas it cannot easily recognize the tone difference when the density is high.

1.4 Effect of First Embodiment

In the first embodiment, the timings at which the first energizing pulse and the second energizing pulse are generated are distributed within one line period, and the timing at which the first energizing pulse is generated and an unevenly distributed portion included in the timings at which the first energizing pulse and the second energizing pulse are generated are arranged in an initial period of one line period. Therefore, even when the density of an image is low, deterioration in printing quality such as uneven printing can be suppressed. The deterioration in printing quality such as uneven printing can be effectively suppressed particularly at a printing start portion of an image where a color development is likely to be difficult due to low temperature of each heating element.

In addition, in the first embodiment, the timings at which the first energizing pulse and the second energizing pulse are generated are distributed within one line period. Therefore, even when the density of an image printed on the paper 170 is high and even when printing is continuously performed, continuous heating of ink ribbon 180 can be suppressed, so that deterioration in printing quality such as printing defects and reduction in glossiness of a printing surface can be suppressed.

For example, in a drive signal D804 shown in FIG. 5, timings at which the energizing pulses P1, P2, P3, and P4 are generated are concentrated near the beginning of one line period. Further, in a drive signal D904 shown in FIG. 6, timings at which the energizing pulses P1, P2, P9, and P10 are generated are concentrated near the beginning or the middle of one line period. Therefore, it is difficult to suppress deterioration in printing quality such as uneven printing, printing defects, and reduction in glossiness of a printing surface. On the other hand, in the drive signal D103 shown in FIG. 4, the timings at which the first energizing pulse P1 and the second energizing pulses P5, P9 and P13 are generated are distributed within one line period, and therefore, deterioration in printing quality such as uneven printing, printing defects, and reduction in glossiness of a printing surface can be easily suppressed.

2 Second Embodiment

FIG. 1 is a block diagram illustrating a thermal transfer printer according to the second embodiment. FIG. 2 is a schematic view illustrating a printing mechanism provided in the thermal transfer printer according to the second embodiment.

The second embodiment is different from the first embodiment in the following points. In the first embodiment, when timings at which the first energizing pulse and the second energizing pulse are generated cannot be evenly distributed within one line period, the CPU 114 distributes the timings at which the second energizing pulses are generated in a division pattern within one line period. In contrast, in the second embodiment, when the timings at which the first energizing pulse and the second energizing pulse are generated cannot be evenly distributed within one line period, the CPU 114 almost evenly distributes the timings at which the second energizing pulses are generated within a period other than the beginning of one line period so as to minimize uneven distribution of the timings at which the second energizing pulses are generated.

Except for the configuration providing the above difference, a thermal transfer printer 200 according to the second embodiment has the same configuration as the configuration of the thermal transfer printer 100 according to the first embodiment.

FIG. 7 is a timing chart illustrating a strobe signal and a drive signal generated in one line period in which the thermal transfer printer in the second embodiment performs printing of one line. FIG. 8 is a diagram illustrating an LUT stored in a memory provided in the thermal transfer printer according to the second embodiment.

The LUT 210 shown in FIG. 8 contains waveforms of drive signals D200 to D216 which are shown in FIG. 7 and which respectively correspond to specific values 1 to 17 of drive data d. The drive signals D200 to D216 are drive signals of tones 0 to 16, respectively. The waveform of each of the drive signals D200 to D216 is written by specifying whether each pulse signal number is "ON" or "OFF". A pulse signal number being "ON" means that an energizing pulse to which the pulse signal number is assigned is generated. A pulse signal number being "OFF" means that an energizing pulse to which the pulse signal number is assigned is not generated.

In the second embodiment, the CPU 114 generates the first energizing pulse at the beginning of one line period and the second energizing pulse in one line period, as in the first embodiment. Further, when the timings at which the first energizing pulse and the second energizing pulses are generated can be evenly distributed within one line period, the CPU 114 evenly distributes the timings within one line period, and when the timings cannot be evenly distributed within one line period, the CPU 114 distributes the timings within one line period such that an unevenly distributed portion included in the timings is arranged in an initial period of one line period.

However, in the second embodiment, when the timings at which the first energizing pulse and the second energizing pulse are generated cannot be evenly distributed within one line period, the CPU 114 almost evenly distributes the timings at which the second energizing pulses are generated within a period other than the beginning of one line period so as to minimize uneven distribution of the timings at which the second energizing pulses are generated.

For example, the extent of the uneven distribution of the second energizing pulses P6 and P11 included in the drive signal D202 of tone 2 shown in FIG. 7 is smaller than the extent of the uneven distribution of the second energizing pulses P5 and P9 included in the drive signal D102 of tone 2 shown in FIG. 4, which means that the uneven distribution is minimized.

In the second embodiment, even when the density of the image printed on the paper 170 is low, deterioration in printing quality such as uneven printing can also be suppressed as in the first embodiment. The deterioration in printing quality such as uneven printing can be effectively suppressed particularly at a printing start portion of an image where a color development is likely to be difficult due to low temperature of each heating element.

In addition, in the second embodiment, even when the density of an image printed on the paper 170 is high and even when printing is continuously performed, continuous heating of ink ribbon 180 can be suppressed, so that deterioration in printing quality such as printing defects and reduction in glossiness of a printing surface can be suppressed, as in the first embodiment.

3 Third Embodiment

FIG. 1 is a block diagram illustrating a thermal transfer printer according to the third embodiment. FIG. 2 is a schematic view illustrating a printing mechanism provided in the thermal transfer printer according to the third embodiment.

The third embodiment is different from the second embodiment in the following points. In the second embodiment, the maximum value of the total of the number of first energizing pulses generated in one line period and the number of second energizing pulses generated in one line period is sixteen which is equal to the number of tones. In contrast, in the third embodiment, the maximum value is thirty-two which is twice the number of tones.

Except for the configuration providing the above difference, a thermal transfer printer 300 according to the third embodiment has the same configuration as the configuration of the thermal transfer printer 200 according to the second embodiment. The thermal transfer printer 300 according to the third embodiment may employ a configuration similar to the configuration employed in the thermal transfer printer 100 according to the first embodiment.

Figure 9:
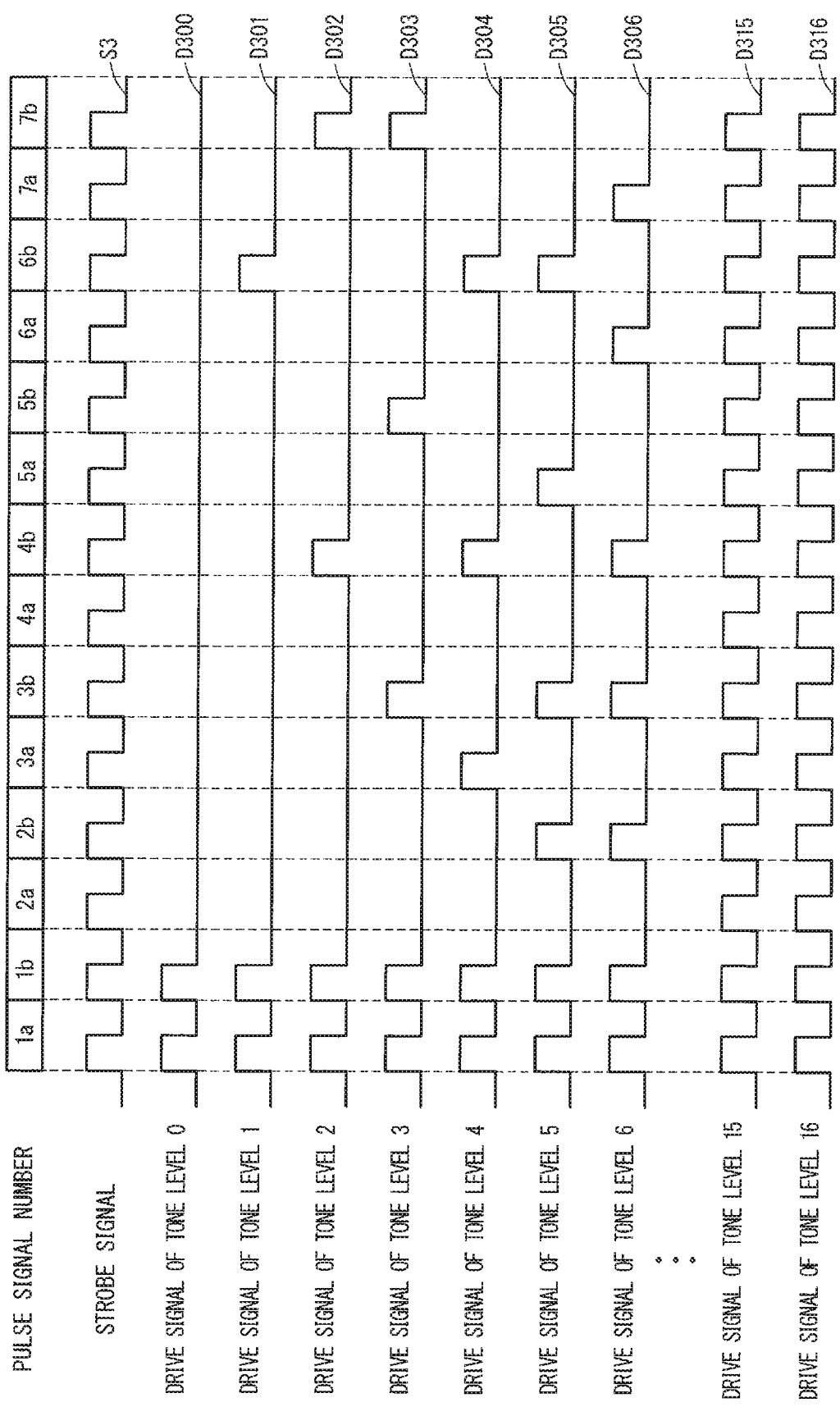
FIG. 9 is a timing chart illustrating a strobe signal and a drive signal generated in one line period in which the thermal transfer printer in the third embodiment performs printing of one line.
Figure 10:
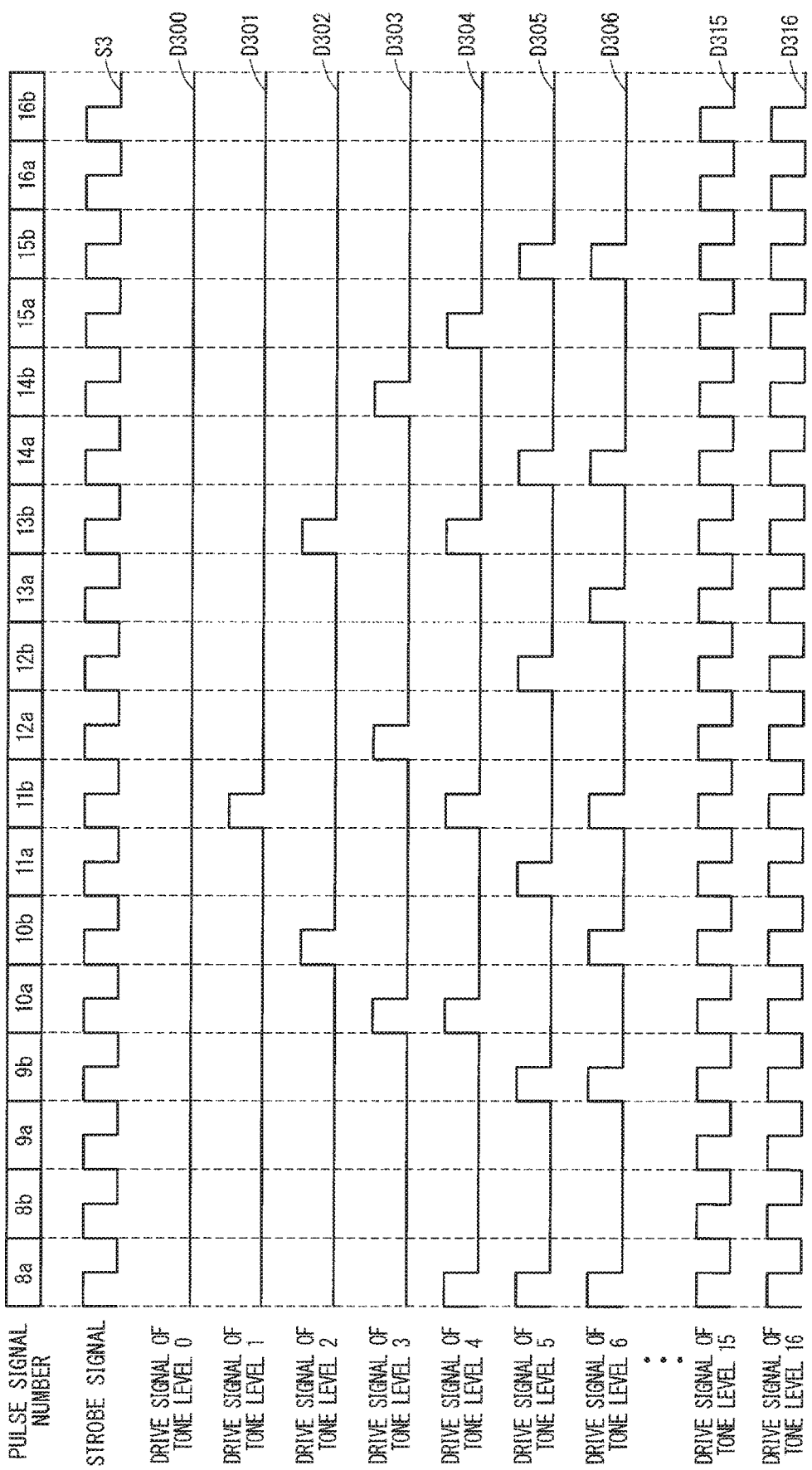
FIG. 10 is a timing chart illustrating a strobe signal and a drive signal generated in one line period in which the thermal transfer printer in the third embodiment performs printing of one line.

FIGS. 9 and 10 show a timing chart which is divided and which illustrates a strobe signal and a drive signal generated in one line period in which the thermal transfer printer in the third embodiment performs printing of one line. FIGS. 11 and 12 show an LUT which is divided and which is stored in a memory provided in the thermal transfer printer in the third embodiment.

The LUT 310 shown in FIGS. 11 and 12 contains the waveforms of drive signals D300 to D316 which are shown in FIGS. 9 and 10 and which respectively correspond to specific values 1 to 17 of the drive data d. The drive signals D300 to D316 are drive signals of tones 0 to 16, respectively. The waveform of each of the drive signals D300 to D316 is written by specifying whether each pulse signal number is "1" or "0". A pulse signal number being "1" means that an energizing pulse to which the pulse signal number is assigned is generated. A pulse signal number being "0" means that an energizing pulse to which the pulse signal number is assigned is not generated.

In the third embodiment, the CPU 114 also generates the first energizing pulse at the beginning of one line period and generates the second energizing pulse in one line period, as in the second embodiment. Further, when the timings at which the first energizing pulse and the second energizing pulse are generated can be evenly distributed within one line period, the CPU 114 evenly distributes the timings within one line period, and when the timings cannot be evenly distributed within one line period, the CPU 114 distributes the timings within one line period such that an unevenly distributed portion included in the timings is arranged in an initial period of one line period.

In addition, in the third embodiment, when the timings at which the first energizing pulse and the second energizing pulse are generated cannot be evenly distributed within one line period, the CPU 114 almost evenly distributes the timings at which the second energizing pulses are generated within a period other than the beginning of one line period so as to minimize uneven distribution of the timings at which the second energizing pulses are generated, as in the second embodiment.

However, in the third embodiment, the maximum value of the total of the number of first energizing pulses generated in one line period and the number of second energizing pulses generated in one line period is thirty-two which is twice the number of tones of an image to be printed. The length of one line period in which the thermal transfer printer 300 in the third embodiment prints one line on the paper 170 is the same as the length of one line period in which the thermal transfer printer 200 in the second embodiment prints one line on the paper 170, and therefore, the frequency of the strobe signal S3 generated by the thermal transfer printer 300 in the third embodiment is twice the frequency of the strobe signal S2 generated by the thermal transfer printer 200 in the second embodiment. The maximum value which is an integer multiple of the number of tones may be three times or more the number of tones.

In the third embodiment, even when the density of the image printed on the paper 170 is low, deterioration in printing quality such as uneven printing can also be suppressed as in the second embodiment. The deterioration in printing quality such as uneven printing can be effectively suppressed particularly at a printing start portion of an image where a color development is likely to be difficult due to low temperature of each heating element.

In addition, in the third embodiment, even when the density of an image printed on the paper 170 is high and even when printing is continuously performed, continuous heating of the ink ribbon 180 can be suppressed, so that deterioration in printing quality such as printing defects and reduction in glossiness of a printing surface can be suppressed, as in the second embodiment.

In addition, in the third embodiment, the time in which each heating element is energized by the corresponding second energizing pulse is shortened, and when each heating element is energized by the corresponding second energizing pulse, current flowing through the heating element decreases. Therefore, continuous heating of the ink ribbon 180 can be further suppressed. In addition, thermal damage caused on the ink ribbon 180 can be suppressed. Therefore, deterioration in printing quality such as printing defects and reduction in glossiness of the printing surface can be further suppressed.

It is to be noted that various modifications and omissions can be made, as appropriate, for the embodiments within the scope of the present invention.

While the present invention has been described in detail, the foregoing description is in all aspects illustrative and not restrictive. It is therefore understood that numerous modifications and variations can be conceived of without departing from the scope of the present invention.

EXPLANATION OF REFERENCE SIGNS 100, 200, 300: thermal transfer printer
114: central processing unit (CPU)
118: thermal head
120: thermal head driving unit
170: paper
180: ink ribbon
D100, D101, D102, D103, D104, D105, D106, D115, D116, D200, D201, D202, D203, D204, D205, D206, D215, D216, D300, D301, D302, D303, D304, D305, D306, D315, D316, D804, D904: drive signal P1: first energizing pulse
P2, P3, P4, P5, P6, P7, P8, P9, P10, P11, P12, P13, P14, P15, P16: second energizing pulse

The invention claimed is:

1. A thermal transfer printer comprising:
a thermal head equipped with a plurality of heating elements arranged linearly; and
a generation unit that generates a first energizing pulse that causes each heating element included in the plurality of heating elements to perform offset heating at the beginning of one line period in which printing of one line is performed, and generates, in the one line period, second energizing pulses whose number corresponds to a tone level, the second energizing pulses causing the each heating element to perform heating, wherein the generation unit evenly distributes timings at which the first energizing pulse and the second energizing pulses are generated within the one line period, when even distribution of the timings within the one line period is enabled, and distributes the timings within the one line period such that an unevenly distributed portion included in the timings is arranged in an initial period of the one line period, when even distribution of the timings within the one line period is not enabled, wherein the generation unit minimizes uneven distribution of the second energizing pulses when even distribution of the timings within the one line period is not enabled.

2. The thermal transfer printer according to claim 1, wherein the generation unit saturates a total of the number of the first energizing pulses and the number of the second energizing pulses when the tone level is equal to or greater than a threshold value.

3. The thermal transfer printer according to claim 1, wherein a maximum value of the total of the number of the first energizing pulses and the number of the second energizing pulses is twice or more the number of tones and is an integral multiple of the number of the tones.

4. A method for producing a printed matter comprising:
generating a first energizing pulse at the beginning of one line period in which printing of one line is performed, the first energizing pulse causing each heating element included in a plurality of heating elements to perform offset heating, the plurality of heating elements being provided to a thermal head of a thermal transfer printer that produces the printed matter;
generating, in the one line period, second energizing pulses whose number corresponds to a tone level, the second energizing pulses causing the each heating element to perform heating; and
evenly distributing timings at which the first energizing pulse and the second energizing pulses are generated within the one line period, when even distribution of the timings within the one line period is enabled, and distributing the timings within the one line period such that an unevenly distributed portion included in the timings is arranged in an initial period of the one line period, when even distribution of the timings within the one line period is not enabled,
wherein the generation minimizes uneven distribution of the second energizing pulses when even distribution of the timings within the one line period is not enabled.

* * * * *